US012561417B2

(12) United States Patent
Fabbrizio et al.

(10) Patent No.: US 12,561,417 B2
(45) Date of Patent: Feb. 24, 2026

(54) SECURE BIOMETRIC ALGORITHM PROVISION

(71) Applicants: HID Global Corp., Austin, TX (US); HID Czech s.r.o., Prague (CZ)

(72) Inventors: Vito Fabbrizio, Berkeley, CA (US); Vladimir Lieberzeit, Prague (CZ)

(73) Assignees: HID Czech s.r.o., Prague (CZ); HID Global Corp., Austin, TX (US)

( * ) Notice: Subject to any disclaimer, the term of this patent is extended or adjusted under 35 U.S.C. 154(b) by 168 days.

(21) Appl. No.: 18/461,009

(22) Filed: Sep. 5, 2023

(65) Prior Publication Data

US 2024/0078301 A1    Mar. 7, 2024

Related U.S. Application Data

(60) Provisional application No. 63/374,642, filed on Sep. 6, 2022.

(51) Int. Cl.
*G06F 21/32* (2013.01)
*G06F 8/65* (2018.01)
*G06F 21/45* (2013.01)

(52) U.S. Cl.
CPC ................ *G06F 21/32* (2013.01); *G06F 8/65* (2013.01); *G06F 21/45* (2013.01)

(58) Field of Classification Search
CPC ............. G06F 21/32; G06F 8/65; G06F 21/45
See application file for complete search history.

(56) References Cited

U.S. PATENT DOCUMENTS

| | | | |
|---|---|---|---|
| 2015/0161461 A1* | 6/2015 | McNulty | G06V 40/1388 |
| | | | 382/116 |
| 2018/0181479 A1* | 6/2018 | Pappu | G06F 11/3604 |
| 2018/0189512 A1* | 7/2018 | Monaco | H04L 63/1441 |
| 2018/0224999 A1* | 8/2018 | Lee | H04W 12/06 |
| 2019/0130083 A1* | 5/2019 | Agassy | H04L 9/3231 |
| 2022/0114243 A1* | 4/2022 | Ross | G06F 21/6227 |

* cited by examiner

*Primary Examiner* — Cheng-Feng Huang
(74) *Attorney, Agent, or Firm* — Schwegman Lundberg & Woessner, P.A.

(57) ABSTRACT

Systems and methods may be used for operation of a hardware fingerprint processing device. A method may include receiving an update including a fingerprint authentication algorithm, verifying a digital signature of the fingerprint authentication algorithm, and in response to verifying the digital signature, loading the fingerprint authentication algorithm into the memory. The loaded fingerprint authentication algorithm may be sued to authenticate a user. For example, a verification method may include receiving information corresponding to an image of a fingerprint, determining whether the fingerprint is authenticated using the fingerprint authentication algorithm, and optionally outputting an indication of whether the fingerprint is authenticated.

18 Claims, 5 Drawing Sheets

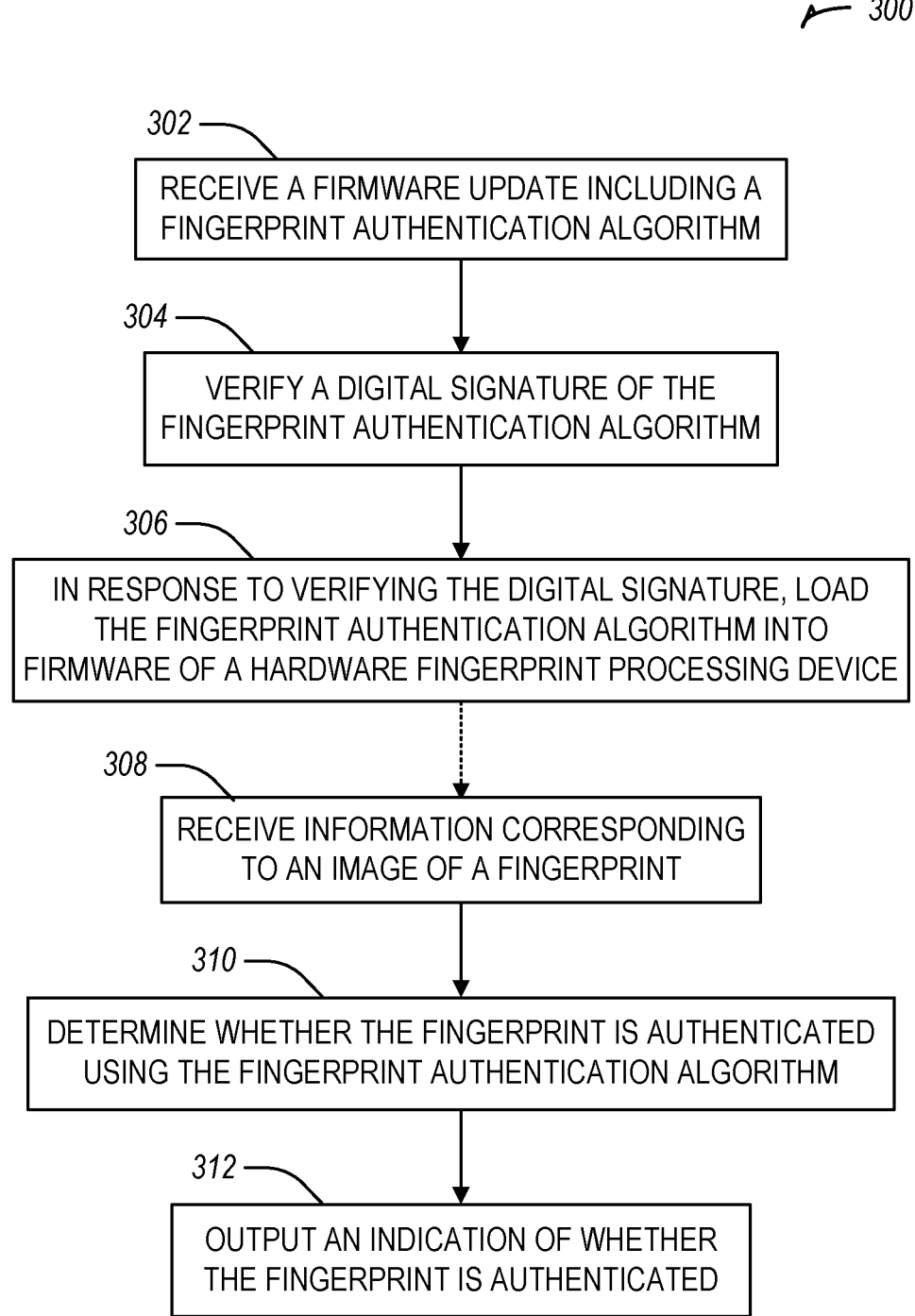

*300*

302 — RECEIVE A FIRMWARE UPDATE INCLUDING A FINGERPRINT AUTHENTICATION ALGORITHM

304 — VERIFY A DIGITAL SIGNATURE OF THE FINGERPRINT AUTHENTICATION ALGORITHM

306 — IN RESPONSE TO VERIFYING THE DIGITAL SIGNATURE, LOAD THE FINGERPRINT AUTHENTICATION ALGORITHM INTO FIRMWARE OF A HARDWARE FINGERPRINT PROCESSING DEVICE

308 — RECEIVE INFORMATION CORRESPONDING TO AN IMAGE OF A FINGERPRINT

310 — DETERMINE WHETHER THE FINGERPRINT IS AUTHENTICATED USING THE FINGERPRINT AUTHENTICATION ALGORITHM

312 — OUTPUT AN INDICATION OF WHETHER THE FINGERPRINT IS AUTHENTICATED

*FIG. 3*

SECURE BIOMETRIC ALGORITHM PROVISION

CLAIM OF PRIORITY

This application claims the benefit of priority to U.S. Provisional Application No. 63/374,642, filed Sep. 6, 2022, titled "Secure Biometric Algorithm Provision"; which is hereby incorporated herein by reference in its entirety.

BACKGROUND

Providers of centralized fingerprint-based or other biometric-based authentication solutions for desktop computers, laptops, phones, etc. often require access to the raw fingerprint or other biometric data from a locally integrated fingerprint or other biometric capture device. This allows for use of a biometric algorithm (e.g., a template extractor) of varying security/complexity levels to process the fingerprint image or other biometric information to extract the relevant data from the template (e.g., biometric information used for matching fingerprints or other biometric input). Using a high-grade proprietary biometric algorithm often gives a solution provider a competitive advantage. Moreover, it allows those providers to deliver functionality such as roaming and central-server based identification systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates a flowchart showing a technique for biometric authentication in accordance with some embodiments.

DETAILED DESCRIPTION

Figure 1:
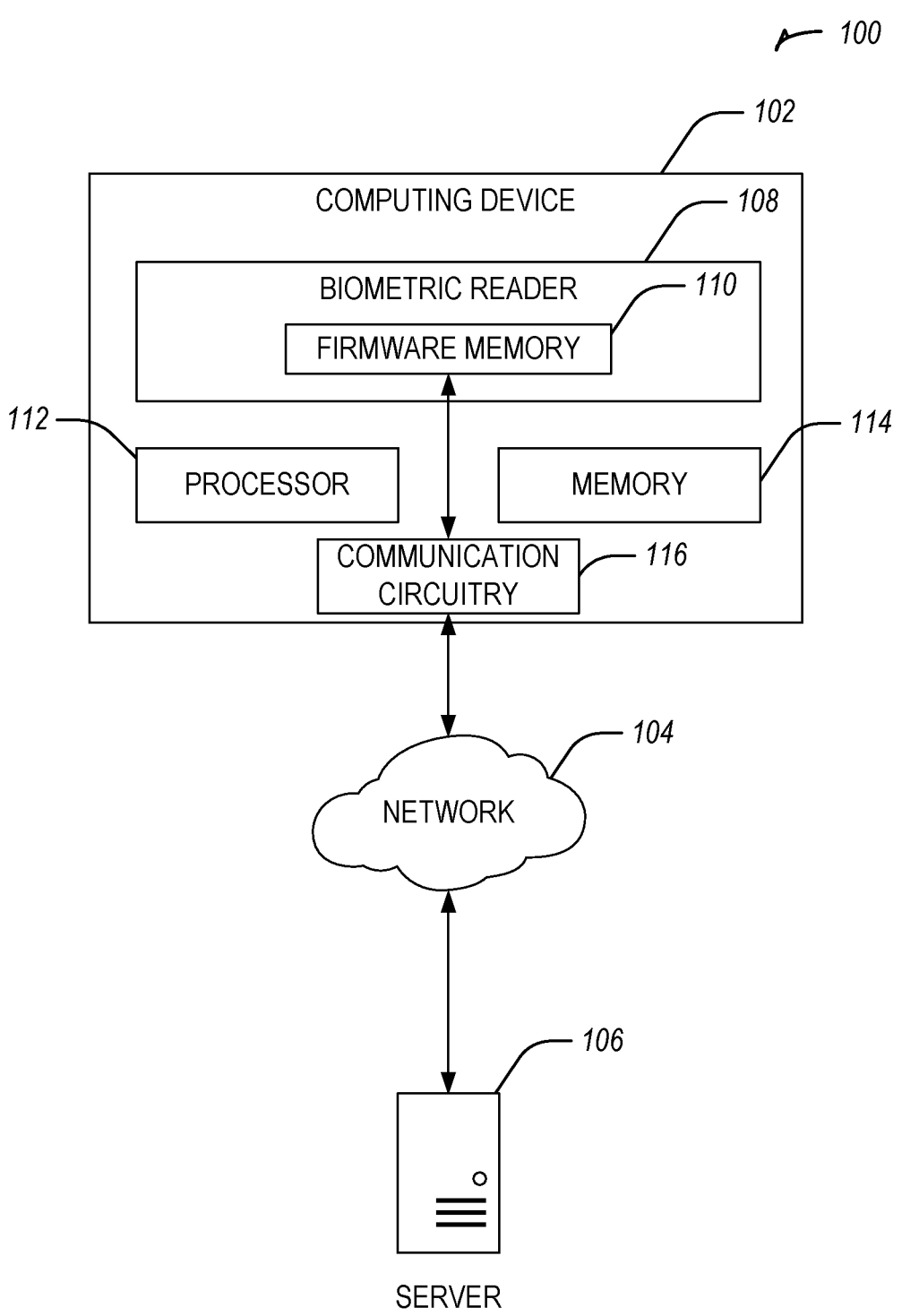
FIG. 1 illustrates a system for provisioning a secure biometric algorithm at a biometric reader in accordance with some embodiments.

The systems and techniques described herein provide for loading a secure authentication algorithm into memory of biometric hardware. Biometric hardware is often limited by the specific algorithm that is used to authenticate a user. For example, default algorithms may take a long time, be less secure, or be less accurate than other specific algorithms. However, allowing loading of aftermarket algorithms may decrease security or cause interoperability issues. Allowing loading of algorithms that communicate with a server, which may be more accurate, may take a long time or be less secure (e.g., due to the inherent insecurity possible with remote communications). To solve these technical problems, the present systems and techniques include loading a secure authentication algorithm, for example into firmware of a biometric hardware device, to execute the secure authentication algorithm for verification of a user. The secure authentication algorithm may be authenticated prior to loading or use (e.g., using a key corresponding to the secure authentication algorithm).

In some examples, to enhance the security and privacy in an operating system, a hardware biometric device (e.g., a fingerprint reader) may be prevented from exporting an image or a portion of an image (e.g., preventing use of a server for processing a portion of the image or the entire image). Instead, the biometric device may use a built-in biometric algorithm to process the image locally. However, such biometric devices do not implement proprietary biometric algorithms, which may be relevant for only one of many solution providers, but which may provide better security.

In some examples, a biometric template may be output from a biometric device in a standard format (e.g., ISO 19794-2 for fingerprint readers). However, the standard format may have lower performance than proprietary formats used by proprietary biometric algorithms because the standard format may not support special features of the proprietary algorithm. In addition, the standard format may only be practical for minutiae-based algorithms, which, for example, may require large fingerprint images and correspondingly larger and more expensive fingerprint readers. Smaller readers may require a different class of algorithms (e.g., pattern-based matching), for which the standard format may be unusable. Similar issues may apply for other biometric algorithms or capture devices, such as facial recognition and camera systems, voice recognition and microphones, or the like.

The systems and techniques described herein may be used with a fingerprint reader (e.g., a reader built-in inside a laptop) to prevent fingerprint export from the reader (e.g., for privacy and security reasons), and support a third-party authentication solution provider. In some examples, multiple third-party authentication solution providers are supported, each of which may use a different proprietary biometric algorithm. The systems and techniques described herein may provide a firmware upload capability inside a fingerprint reader, which allows for secure loading of a proprietary biometric algorithm as a separate module. In some examples, multiple authentication solution providers may be supported with different proprietary biometric algorithms, for example without the need to export a fingerprint image, providing privacy and security.

FIG. 1 illustrates a system 100 for provisioning a secure biometric algorithm at a biometric reader in accordance with some embodiments. The system 100 includes a computing device 102 (e.g., a computer, such as a laptop or desktop, a mobile device, such as a tablet or phone, or the like). The computing device includes a biometric reader 108 (e.g., a fingerprint reader, a camera, a microphone, etc.), which includes memory, such as firmware 110. The computing device 102 may include a processor 112, memory 114 (e.g., separate from the memory of the biometric reader 108), and communication circuitry 116. The communication circuitry 116 may be used by the computing device 102 to communicate with a server 106, such as via a network 104 (e.g., a proprietary network, the internet, etc.).

The firmware 110 may be used to load a secure authentication algorithm for operation of the biometric reader 108. In some examples, memory locations in the firmware 110 corresponding to operation of secure authentication algorithms at the biometric reader 108 may be initially blank or unused. "Initially" may include at time of manufacture of the biometric reader 108, at time of manufacture, final assembly, shipping, or delivery of the computing device 102, on first use of the computing device 102 or the biometric reader 108 by an end user, before installation of an application for use of the biometric reader 108, or the like. In other examples, the firmware 110 may include a default secure authentication algorithm.

A provider of a secure authentication algorithm may provide an installation process to load a secure authentication algorithm into the biometric reader 108. The installation process may be initiated by an end user. For example, the end user may install or launch an application that uses the biometric reader 108, the end user may access software corresponding to the biometric reader 108, or the like. In an example, the secure authentication algorithm may be stored in the firmware 110. In another example, the secure authentication algorithm may be stored in the memory 114, or temporarily stored in the memory 114 before being loaded in the firmware 110. In other examples, the installation process may include querying an owner of a secure authentication algorithm (e.g., an owner or operator of an application that runs on the computing device 102 and that uses the biometric reader 108), such as by navigating to a website or sending an indication (e.g., via the communication circuitry 116 to the server 106 over the network 104). The owner may receive the query and provide data, corresponding to the secure authentication algorithm, to the biometric reader 108. The data may include an executable file, in some examples. The executable file may run at the computing device 102 (e.g., executed by the processor 112, and stored in the memory 114), or may, in some examples, execute using processing circuitry of the biometric reader 108. Installation may include confirming the authenticity of the secure authentication algorithm (e.g., using an authentication key). After the installation process is complete, the biometric reader may be used to create a proprietary template suitable for the secure authentication algorithm, in some examples.

In some examples, the secure authentication algorithm may be changed, replaced, or removed. A new installation process may be used to add a new secure authentication algorithm, replace the secure authentication algorithm with a new secure authentication algorithm, or remove the secure authentication algorithm.

The biometric reader 108 may accept only algorithms that are properly digitally signed. For example, the owner of the signing key may be the owner or manufacturer of the biometric reader 108, the computing device 102, or the secure authentication algorithm. For example, the provider of the secure authentication algorithm may receive the signing key of the owner (e.g., via a license), and use the signing key to sign the secure authentication algorithm. Then, during or after the installation process (e.g., before use of or before loading the secure authentication algorithm into the firmware 110), the computing device 102 or the biometric reader 108 may verify that the received data corresponding to the secure authentication algorithm is signed with the signing key. In some examples, the installation process may connect to a licensing server (e.g., via the communication circuitry 116 and the network 104) to provide information corresponding to which secure authentication algorithm is attempting to be installed on the biometric reader 108. The biometric reader 108 may be represented by a unique reader identifier, in some examples, such that the license may be specific to the particular biometric reader 108 or computing device 102. The licensing server may permit the installation process to continue, for example by digitally signing an installation permit, which may be checked by the biometric reader 108.

The biometric reader 108 may store captured images (which may be captured with a sensor of the biometric reader 108, in some examples), such as in memory of the biometric reader 108. The captured images may not be accessible by the computing device 102 (e.g., not accessible by the processor 112 or the communication circuitry 116) in some examples. In other examples, captured images may be stored in the memory 114, or sent to the server 106.

The biometric reader 108 may communicate with the computing device 102 through a communication channel. This channel may be used by the computing device 102 to send a command to the biometric reader 108 (e.g., updated firmware, a request to authenticate a user, etc.) or to receive a response from the biometric reader 108 (e.g., an indication that a user is authenticated). The communication channel may include a universal serial bus (USB) connection, other wired connection, a wireless connection, or the like. A proprietary protocol may be used for communication over the communication channel (e.g., one provided by a vendor of the biometric reader 108).

Figure 2:
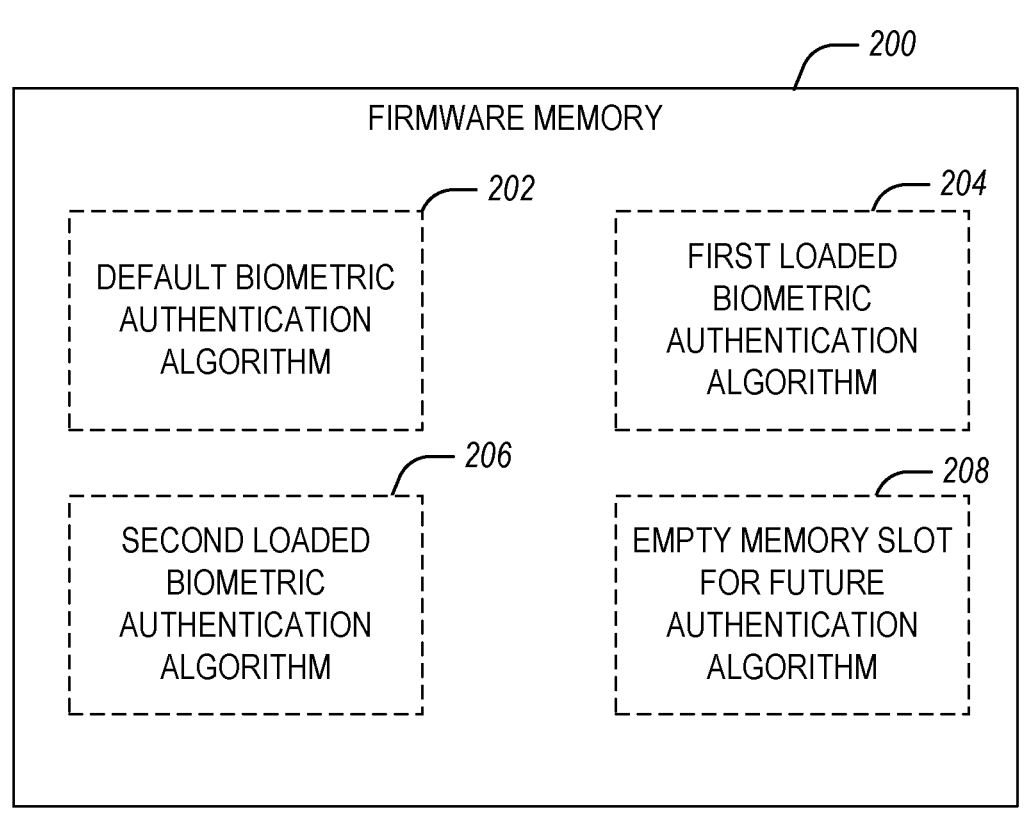
FIG. 2 illustrates a block diagram illustrating firmware memory of a biometric device in accordance with some embodiments.

FIG. 2 illustrates a block diagram illustrating firmware memory 200 of a biometric device in accordance with some embodiments. The firmware memory 200 may be part of a fingerprint reader in some examples. The firmware memory 200 is shown with example memory slots 202-208, although additional or fewer components may be present (e.g., more or less slots), or only a single slot may be available for storing a biometric authentication algorithm in some examples. The firmware memory 200 is shown in FIG. 2 with one or more optional memory locations, which may be used to store a biometric authentication algorithm. Example memory locations in the firmware memory 200 may store a default biometric authentication algorithm 202, a first loaded biometric authentication algorithm 204, a second loaded biometric authentication algorithm 206, an empty memory slot 208, for example for future storage of a biometric authentication algorithm, or the like. In some examples, loading a biometric authentication algorithm may supplement or replace a previously loaded or a default biometric authentication algorithm. For example, the first loaded biometric authentication algorithm 204 may replace the default biometric authentication algorithm 202 or the empty memory slot 208. The second loaded biometric authentication algorithm 206 may replace the first loaded biometric authentication algorithm 204. In some examples, the default biometric authentication algorithm 202, the first loaded biometric authentication algorithm 204, the second loaded biometric authentication algorithm 206, and the empty memory slot 208 may be used or available. In other examples, a subset may be used. In still other examples, more memory slots may be available or used.

When a biometric reader corresponding to the firmware memory 200 is used or accessed, a selected biometric authentication algorithm may be identified. The selected biometric authentication algorithm may be identified by an application using or accessing the biometric reader. For example, a particular app may correspond to the first loaded biometric authentication algorithm 204 and another app may correspond to the second loaded biometric authentication algorithm 206, while a third app uses the default biometric authentication algorithm 202, and a fourth app needs to load a new biometric authentication algorithm into the empty memory slot 208 before using the biometric reader.

FIG. 3 illustrates a flowchart showing a technique 300 for biometric authentication in accordance with some embodiments. In an example, operations of the technique 300 may be performed by processing circuitry, for example by executing instructions stored in memory. The processing circuitry may include a processor, a system on a chip, or other circuitry (e.g., wiring). For example, technique 300 may be performed by processing circuitry of a device (or one or more hardware or software components thereof), such as those illustrated and described with reference to FIG. 1 (e.g., a hardware fingerprint processing device).

The technique 300 includes an operation 302 to receive a firmware update including a fingerprint authentication algorithm, for example at a hardware fingerprint processing device. The technique 300 includes an operation 304 to verify a digital signature of the fingerprint authentication algorithm. The digital signature of the fingerprint authentication algorithm may be generated using a key of a manufacturer of the hardware fingerprint processing device. In this example, verifying the digital signature may include receiving an indication from the manufacturer that the digital signature is valid.

The technique 300 includes an operation 306 to load, in response to verifying the digital signature, the fingerprint authentication algorithm into firmware of a hardware fingerprint processing device. Operation 306 may include replacing an existing algorithm in the firmware or loading the fingerprint authentication algorithm into a blank (e.g., designated) portion of memory in the firmware. The existing algorithm may include a default algorithm, a previously loaded algorithm, a pre-loaded algorithm (e.g., loaded by an original equipment manufacturer), or the like. In some examples, before loading the fingerprint authentication algorithm into the firmware, the firmware may include no existing algorithm for authenticating a fingerprint.

In some examples, the technique 300 may end at operation 306. For example, the loading of the fingerprint authentication algorithm may occur at a different place or time, performed by different entities, etc. In other examples, the fingerprint authentication algorithm may be loaded and used in a same session (e.g., just in time loading of the fingerprint authentication algorithm for use, loaded by an end user, or the like).

The technique 300 includes an operation 308 to receive information corresponding to an image of a fingerprint. The technique 300 includes an operation 310 to determine (for example at the hardware fingerprint processing device) whether the fingerprint is authenticated using the fingerprint authentication algorithm. Operation 310 may include selecting the fingerprint authentication algorithm from among a plurality of fingerprint authentication algorithms. In this example, the technique 300 may include receiving an authentication request from an app, and selecting the fingerprint authentication algorithm based on the request. In some examples, operation 310 may include selecting the fingerprint authentication algorithm from among the plurality of fingerprint authentication algorithms based on the information corresponding to the image. Operation 310 may include deleting the information corresponding to the image after authentication without exporting the image. The technique 300 includes an operation 312 to output an indication of whether the fingerprint is authenticated. The indication may be used (e.g., by an app) to allow a user corresponding to the fingerprint to access a secured resource.

Figure 4:
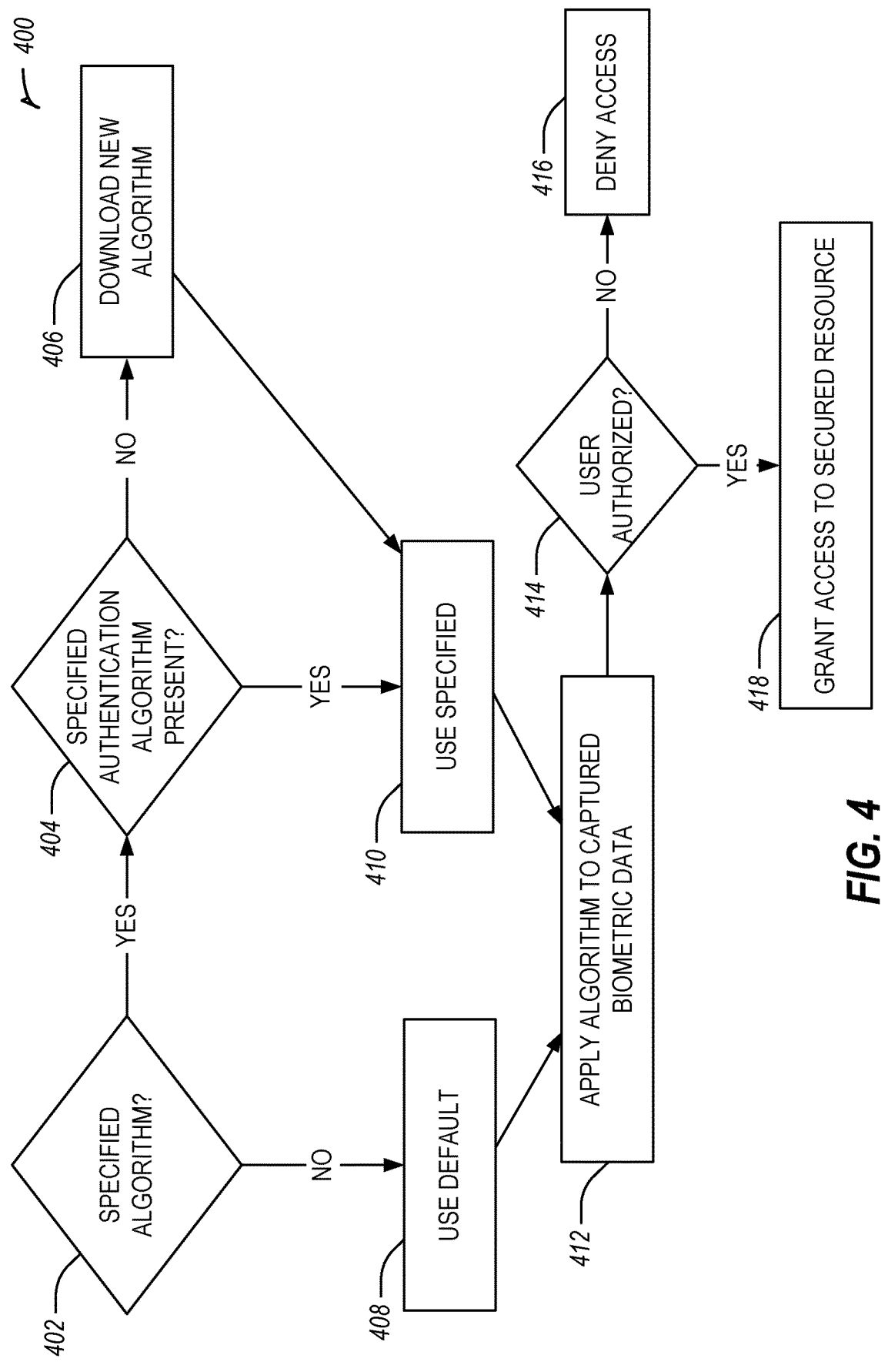
FIG. 4 illustrates an example flow diagram for biometric algorithm loading and use in accordance with some embodiments.

FIG. 4 illustrates an example flow diagram 400 for biometric algorithm loading and use in accordance with some embodiments. The flow diagram 400 may be used with a biometric reader, such as a fingerprint reader, a camera (e.g., for facial recognition, gait recognition, etc.), a microphone (e.g., for voice recognition, cadence recognition, password or phrase recognition, etc.), retinal scanner, or the like.

The flow diagram 400 includes determining whether a particular algorithm is specified at decision block 402. The particular algorithm may be specified by a user, an application, an access type, a credential type, etc. When no particular algorithm is specified, the flow diagram 400 moves to block 408 to use a default algorithm. When a particular algorithm is specified, the flow diagram 400 moves to decision block 404 to determine whether the specified authentication algorithm is present (e.g., in firmware of the biometric reader). When the specified algorithm is present, the flow diagram 400 moves to block 410. When the specified algorithm is not present, the flow diagram 400 may include downloading the specified algorithm at block 406. After downloading, the specified algorithm may be loaded (e.g., into firmware of the biometric reader), and the flow diagram 400 may return to block 410 to use the specified algorithm. After identifying which algorithm to use, the flow diagram 400 moves to block 412 to apply the algorithm to captured biometric data (e.g., an image, a video, an audio capture, etc.). The algorithm may determine whether the captured biometric data indicates a user is authorized at decision block 414. When the user is authorized, the flow diagram 400 may include granting, to the user, access to a secured resource at block 418. When the user is not authorized, the flow diagram 400 may include denying access to the user at block 416. In some examples, after denying access at block 416, the flow diagram 400 may return to block 412 to reattempt the authorization determination.

Figure 5:
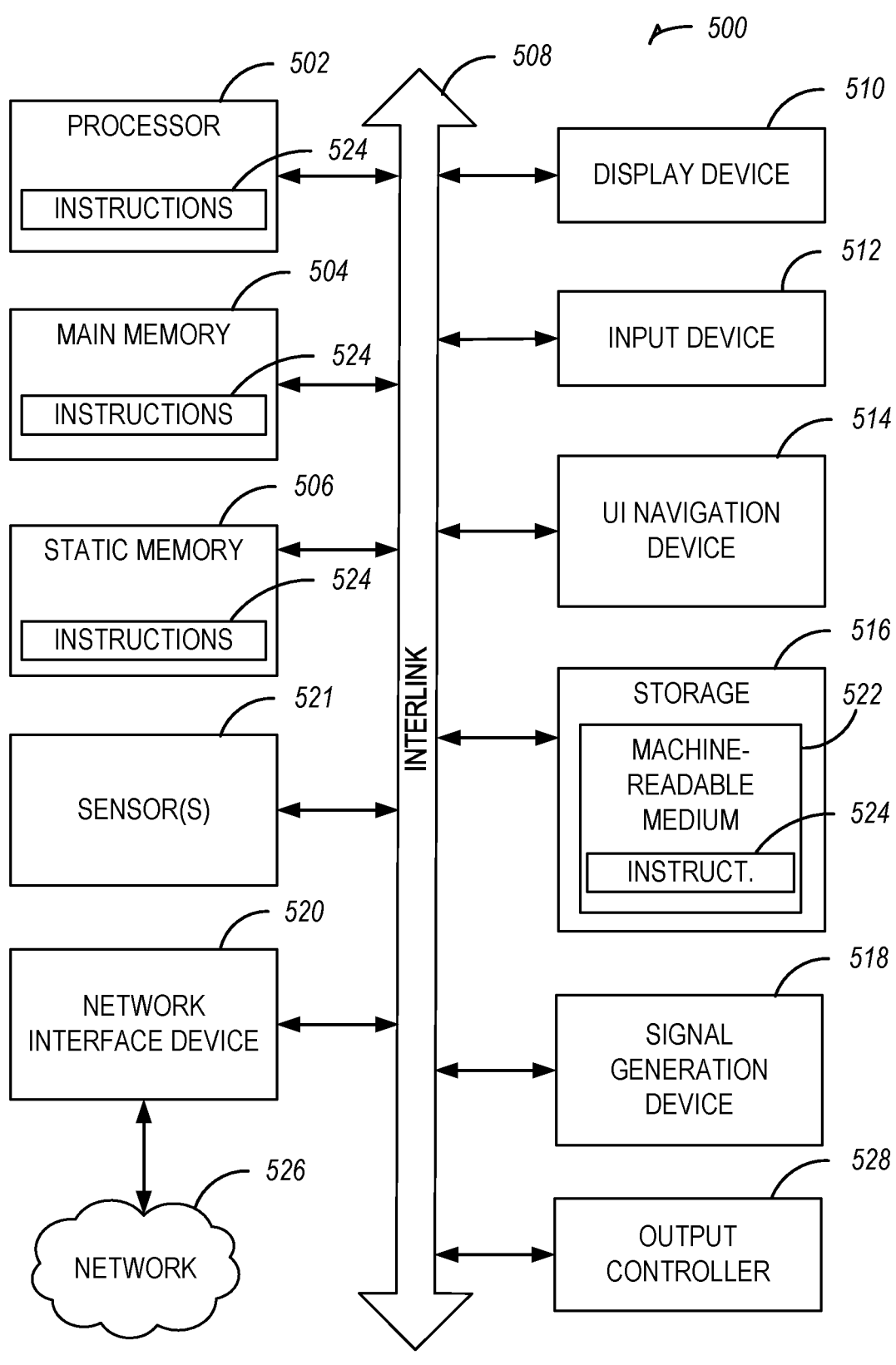
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Example 1 is a method comprising: receiving, at a hardware fingerprint processing device, a firmware update including a fingerprint authentication algorithm; verifying a digital signature of the fingerprint authentication algorithm; in response to verifying the digital signature, loading the fingerprint authentication algorithm into firmware of the hardware fingerprint processing device; receiving information corresponding to an image of a fingerprint; determining, at the hardware fingerprint processing device, whether the fingerprint is authenticated using the fingerprint authentication algorithm; and outputting an indication of whether the fingerprint is authenticated.

In Example 2, the subject matter of Example 1 includes, wherein determining whether the fingerprint is authenticated includes selecting the fingerprint authentication algorithm from among a plurality of fingerprint authentication algorithms.

In Example 3, the subject matter of Example 2 includes, receiving an authentication request from an app, and wherein selecting the fingerprint authentication algorithm from among the plurality of fingerprint authentication algorithms includes selecting the fingerprint authentication algorithm based on the request.

In Example 4, the subject matter of Examples 2-3 includes, wherein selecting the fingerprint authentication algorithm from among the plurality of fingerprint authentication algorithms is based on the information corresponding to the image.

In Example 5, the subject matter of Examples 1-4 includes, wherein loading the fingerprint authentication algorithm into the firmware includes replacing an existing algorithm in the firmware.

In Example 6, the subject matter of Example 5 includes, wherein the existing algorithm is a default algorithm.

In Example 7, the subject matter of Examples 1-6 includes, wherein determining whether the fingerprint is authenticated includes deleting the information corresponding to the image after authentication without exporting the image.

In Example 8, the subject matter of Examples 1-7 includes, wherein before loading the fingerprint authentication algorithm into the firmware, the firmware includes no existing algorithm for authenticating a fingerprint.

In Example 9, the subject matter of Examples 1-8 includes, wherein the digital signature of the fingerprint authentication algorithm is generated using a key of a manufacturer of the hardware fingerprint processing device, and wherein verifying the digital signature includes receiving an indication from the manufacturer that the digital signature is valid.

Example 10 is a hardware fingerprint processing device comprising: image capture circuitry to capture images of a finger; processing circuitry; and memory, including instructions for performing operations, which when executed cause the processing circuitry to: receive an update including a fingerprint authentication algorithm; verify a digital signature of the fingerprint authentication algorithm; in response to verifying the digital signature, load the fingerprint authentication algorithm into the memory; receive information corresponding to an image of a fingerprint from the image capture circuitry; determine whether the fingerprint is authenticated using the fingerprint authentication algorithm; and output an indication of whether the fingerprint is authenticated.

In Example 11, the subject matter of Example 10 includes, wherein to determine whether the fingerprint is authenticated includes selecting the fingerprint authentication algorithm from among a plurality of fingerprint authentication algorithms.

In Example 12, the subject matter of Example 11 includes, operations to receive an authentication request from an app, and wherein to select the fingerprint authentication algorithm from among the plurality of fingerprint authentication algorithms includes selecting the fingerprint authentication algorithm based on the request.

In Example 13, the subject matter of Examples 11-12 includes, wherein to select the fingerprint authentication algorithm from among the plurality of fingerprint authentication algorithms includes using the information corresponding to the image.

In Example 14, the subject matter of Examples 10-13 includes, wherein to load the fingerprint authentication algorithm into the memory includes replacing an existing algorithm in the memory.

In Example 15, the subject matter of Example 14 includes, wherein the existing algorithm is a default algorithm.

In Example 16, the subject matter of Examples 10-15 includes, wherein to determine whether the fingerprint is authenticated includes deleting the information corresponding to the image after authentication without exporting the image.

In Example 17, the subject matter of Examples 10-16 includes, wherein before loading the fingerprint authentication algorithm into the memory, the memory includes no existing algorithm for authenticating a fingerprint.

In Example 18, the subject matter of Examples 10-17 includes, wherein the digital signature of the fingerprint authentication algorithm is generated using a key of a manufacturer of the hardware fingerprint processing device, and wherein to verify the digital signature includes receiving an indication from the manufacturer that the digital signature is valid.

Example 19 is at least one machine-readable medium including instructions for operation of a hardware fingerprint processing device, which when executed by processing circuitry of the hardware fingerprint processing device, cause the processing circuitry to perform operations to:

receive an update including a fingerprint authentication algorithm; verify a digital signature of the fingerprint authentication algorithm; in response to verifying the digital signature, load the fingerprint authentication algorithm into memory; receive information corresponding to an image of a fingerprint captured by image capture circuitry; determine whether the fingerprint is authenticated using the fingerprint authentication algorithm; and output an indication of whether the fingerprint is authenticated.

In Example 20, the subject matter of Example 19 includes, wherein to determine whether the fingerprint is authenticated includes deleting the information corresponding to the image after authentication without exporting the image.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
   receiving, at a hardware fingerprint processing device, a firmware update including a fingerprint authentication algorithm;
   verifying a digital signature of the fingerprint authentication algorithm, wherein the digital signature of the fingerprint authentication algorithm is generated using a key of a manufacturer of the hardware fingerprint processing device, and wherein verifying the digital signature includes receiving an indication from the manufacturer that the digital signature is valid;
   in response to verifying the digital signature, loading the fingerprint authentication algorithm into firmware of the hardware fingerprint processing device;
   receiving information corresponding to an image of a fingerprint;
   determining, at the hardware fingerprint processing device, whether the fingerprint is authenticated using the fingerprint authentication algorithm; and
   outputting an indication of whether the fingerprint is authenticated.

2. The method of claim 1, wherein determining whether the fingerprint is authenticated includes selecting the fingerprint authentication algorithm from among a plurality of fingerprint authentication algorithms.

3. The method of claim 2, further comprising receiving an authentication request from an app, and wherein selecting the fingerprint authentication algorithm from among the plurality of fingerprint authentication algorithms includes selecting the fingerprint authentication algorithm based on the request.

4. The method of claim 2, wherein selecting the fingerprint authentication algorithm from among the plurality of fingerprint authentication algorithms is based on the information corresponding to the image.

5. The method of claim 1, wherein loading the fingerprint authentication algorithm into the firmware includes replacing an existing algorithm in the firmware.

6. The method of claim 5, wherein the existing algorithm is a default algorithm.

7. The method of claim 1, wherein determining whether the fingerprint is authenticated includes deleting the information corresponding to the image after authentication without exporting the image.

8. The method of claim 1, wherein before loading the fingerprint authentication algorithm into the firmware, the firmware includes no existing algorithm for authenticating a fingerprint.

9. A hardware fingerprint processing device comprising:
image capture circuitry to capture images of a finger;
processing circuitry; and
memory, including instructions for performing operations, which when executed cause the processing circuitry to:
receive an update including a fingerprint authentication algorithm;
verify a digital signature of the fingerprint authentication algorithm, wherein the digital signature of the fingerprint authentication algorithm is generated using a key of a manufacturer of the hardware fingerprint processing device, and wherein to verify the digital signature includes receiving an indication from the manufacturer that the digital signature is valid;
in response to verifying the digital signature, load the fingerprint authentication algorithm into the memory;
receive information corresponding to an image of a fingerprint from the image capture circuitry;
determine whether the fingerprint is authenticated using the fingerprint authentication algorithm; and
output an indication of whether the fingerprint is authenticated.

10. The hardware fingerprint processing device of claim 9, wherein to determine whether the fingerprint is authenticated includes selecting the fingerprint authentication algorithm from among a plurality of fingerprint authentication algorithms.

11. The hardware fingerprint processing device of claim 10, further comprising operations to receive an authentication request from an app, and wherein to select the fingerprint authentication algorithm from among the plurality of fingerprint authentication algorithms includes selecting the fingerprint authentication algorithm based on the request.

12. The hardware fingerprint processing device of claim 10, wherein to select the fingerprint authentication algorithm from among the plurality of fingerprint authentication algorithms includes using the information corresponding to the image.

13. The hardware fingerprint processing device of claim 9, wherein to load the fingerprint authentication algorithm into the memory includes replacing an existing algorithm in the memory.

14. The hardware fingerprint processing device of claim 13, wherein the existing algorithm is a default algorithm.

15. The hardware fingerprint processing device of claim 9, wherein to determine whether the fingerprint is authenticated includes deleting the information corresponding to the image after authentication without exporting the image.

16. The hardware fingerprint processing device of claim 9, wherein before loading the fingerprint authentication algorithm into the memory, the memory includes no existing algorithm for authenticating a fingerprint.

17. At least one non-transitory machine-readable medium including instructions for operation of a hardware fingerprint processing device, which when executed by processing circuitry of the hardware fingerprint processing device, cause the processing circuitry to perform operations to:
receive an update including a fingerprint authentication algorithm;
verify a digital signature of the fingerprint authentication algorithm, wherein the digital signature of the fingerprint authentication algorithm is generated using a key of a manufacturer of the hardware fingerprint processing device, and wherein to verify the digital signature includes receiving an indication from the manufacturer that the digital signature is valid;
in response to verifying the digital signature, load the fingerprint authentication algorithm into memory;
receive information corresponding to an image of a fingerprint captured by image capture circuitry;
determine whether the fingerprint is authenticated using the fingerprint authentication algorithm; and
output an indication of whether the fingerprint is authenticated.

18. The at least one machine-readable medium of claim 17, wherein to determine whether the fingerprint is authenticated includes deleting the information corresponding to the image after authentication without exporting the image.

* * * * *